United States Patent [19]

Araki et al.

[11] Patent Number: 5,730,617

[45] Date of Patent: Mar. 24, 1998

[54] GUIDE STRUCTURE FOR AN ELECTRONIC UNIT

[75] Inventors: Mamoru Araki; Takeshi Yanase, both of Shizuoka, Japan

[73] Assignee: Yazaki Corporation, Tokyo, Japan

[21] Appl. No.: 664,801

[22] Filed: Jun. 17, 1996

Related U.S. Application Data

[63] Continuation of Ser. No. 337,227, Nov. 7, 1994, abandoned.

[30] Foreign Application Priority Data

Nov. 10, 1993 [JP] Japan ............... 5-303228

[51] Int. Cl.$^6$ ............................................. H01R 13/64
[52] U.S. Cl. ............................................. 439/374; 439/680
[58] Field of Search ............................ 439/374, 680

[56] References Cited

FOREIGN PATENT DOCUMENTS 3002563  7/1981  Germany ................. 439/680
1101112  7/1989  Japan .

Primary Examiner—Gary F. Paumen
Attorney, Agent, or Firm—Sughrue, Mion, Zinn, Macpeak & Seas

[57] ABSTRACT

A guide structure for an electronic unit in an electrical connection box is attached to a unit attaching surface while inserted along guide walls of an electrical connection box body. Guide grooves, each extending in an electronic unit insertion direction, are arranged at least on outer surfaces of confronting peripheral walls of the electronic unit, and guide ribs that are engageable with the guide grooves and that can position an electronic unit of different size are projectingly disposed on the unit attaching surface. The guide structure for the electronic unit can prevent oblique insertion of the electronic unit when the electronic unit is attached to the electrical connection box while inserted between guide walls of the electrical connection box. The guide structure also allows attachment of the electronic unit of different size.

10 Claims, 3 Drawing Sheets

GUIDE STRUCTURE FOR AN ELECTRONIC UNIT

This is a continuation of application Ser. No. 08/337,227 filed Nov. 7, 1994, now abandoned.

BACKGROUND OF THE INVENTION

The present invention relates to a guide structure for an electronic unit that can prevent oblique insertion of electronic units and position electronic units of different sizes as predetermined when the electronic units are attached to an electrical connection box used for a vehicle and the like.

A conventionally known guide structure of this type is, e.g., as shown in FIG. 4. That is, the guide structure allows an electronic unit 2 to be positioned as predetermined at the four corners of a unit attaching surface 3 of an electrical connection box body 1 to which the electronic unit 2 is attached. Rib-like guide walls 4 are projectingly disposed so that the electronic unit 2 is guided to the unit attaching surface 3. A connector 5 that allows a connector portion (not shown) of the electronic unit 2 to be electrically connected thereto is arranged on the unit attaching surface 3.

On the other hand, the electronic unit 2 has resiliently deformable engagement receiving portions 6. The engagement receiving portions 6 are designed to be engageable with retaining pawls 7 of lock portions 8 arranged on the unit attaching surface 3 of the body 1. Further, an abutment boss 9 for attaching the body 1 to the panel of an automobile body is arranged on top of the body 1, and attaching holes 10 are arranged in lower brackets 13.

For the attachment of the electronic unit 2 in the aforementioned construction, the electronic unit 2 is caused to come closer to the unit attaching surface 3 horizontally as shown by the thick arrow in FIG. 4, and is inserted along the guide walls 4 to thereby engage the connector portion (not shown) of the electronic unit 2 with the connector 5 of the body 1. The electronic unit 2 is then attached to the electrical connection box body 1 in the locked state with the engagement receiving portions 6 engaged with the retaining pawls 7.

Such conventional structure has allowed electronic units to be attached to electrical connection boxes not only with the relatively simple design but also in the reliable manner.

However, the aforementioned conventional structure addresses the following problem. When the size of the unit attaching surface is increased as the electronic unit grows larger, the distances between the guide walls disposed at the four corners are accordingly increased.

When the distances between the guide walls are increased, the function of each guide wall 4 is impaired in terms of the relationship thereof with respect to the electronic unit 2, and this has given way to oblique insertion of the electronic unit 2 into the electrical connection box 1 as shown in FIG. 5. Particularly, if the number of poles of the connector is increased and the connector size is therefore increased as a result of the development of a more highly sophisticated electronic unit, or if the connector 5 is disposed on a single side of the unit attaching surface 3 as shown in the drawings referred to, then it becomes further difficult to attach the electronic unit 2 to the body 1 with a uniform insertion force, and this has aggravated the incidence of oblique insertion and hence adversely affected operability for the attachment.

SUMMARY OF THE INVENTION

The present invention has been made in consideration of the circumstances in a conventional guide structure and its object resides in providing a guide structure for an electronic unit in an electrical connection box, which can improve operability free from wrenches at the time an electronic unit is attached to the electrical connection box and which is such a general-purpose guide structure for the electronic unit as to be applicable also to the attachment of the electronic unit of different size.

To accomplish the above object, the present invention is applied to a guide structure for an electronic unit in an electrical connection box, in which an electronic unit is attached to a unit attaching surface while inserted along guide walls. Such structure is characterized in that guide grooves are disposed at least on the outer surfaces of confronting peripheral walls of the electronic unit so as to extend in a unit insertion direction; and that guide ribs being engageable with the guide grooves and being capable of positioning an electronic unit of different size are projectingly disposed on the unit attaching surface.

After caused to confront the unit attaching surface of the electrical connection box, the electronic unit is inserted toward the electrical connection box body along the guide walls while causing the guide ribs to be engaged with the guide grooves thereof. Therefore, the attaching operation is free from wrenches. In addition, the guide ribs are designed to divide the unit attaching surface into a plurality of parts. Therefore, when an electronic unit of different size is attached to the unit attaching surface, such electronic unit can be positioned as predetermined on the unit attaching surface.

DETAILED DESCRIPTION OF THE PREFERRED EMBODIMENTS

A guide structure for an electronic unit, which is a preferred embodiment of the present invention, will now be described in detail with reference to the drawings.

Figure 1:
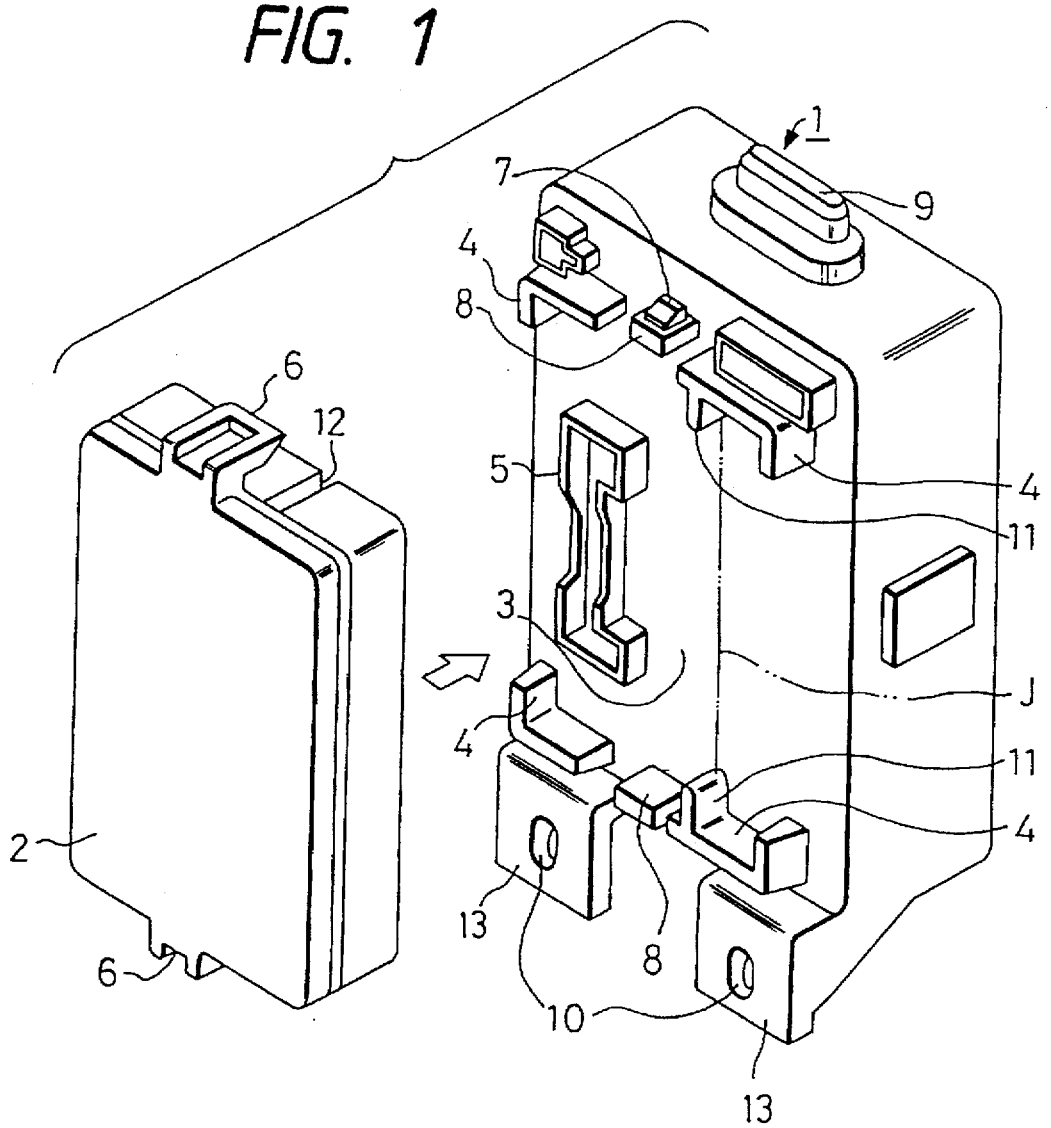
FIG. 1 is a perspective view of an electronic unit before being attached in an embodiment of the present invention.
Figure 2:
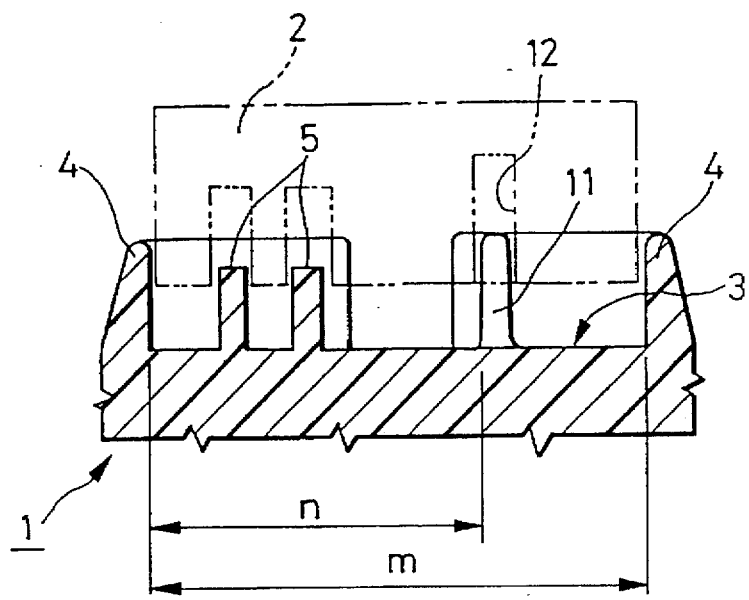
FIG. 2 is a sectional view of a main portion in FIG. 1.
Figure 4:
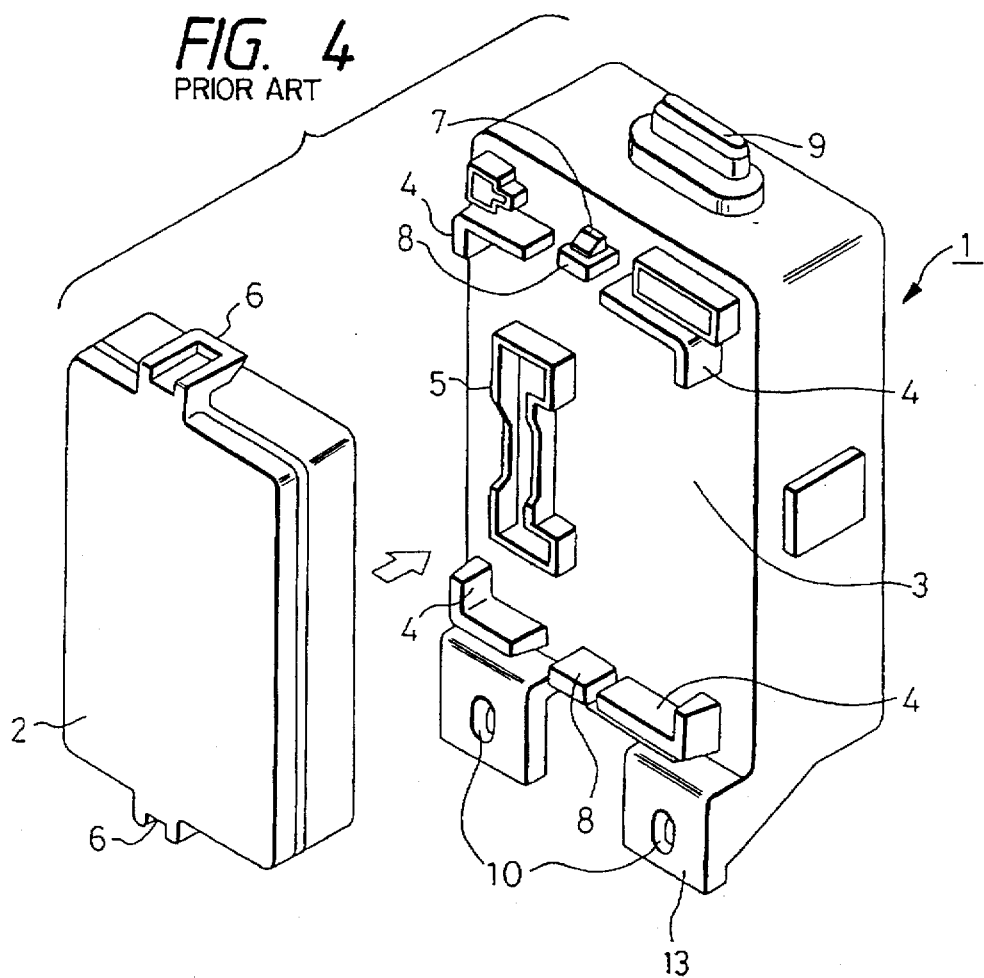
FIG. 4 is a perspective view showing a conventional guide structure for an electronic unit.
Figure 5:
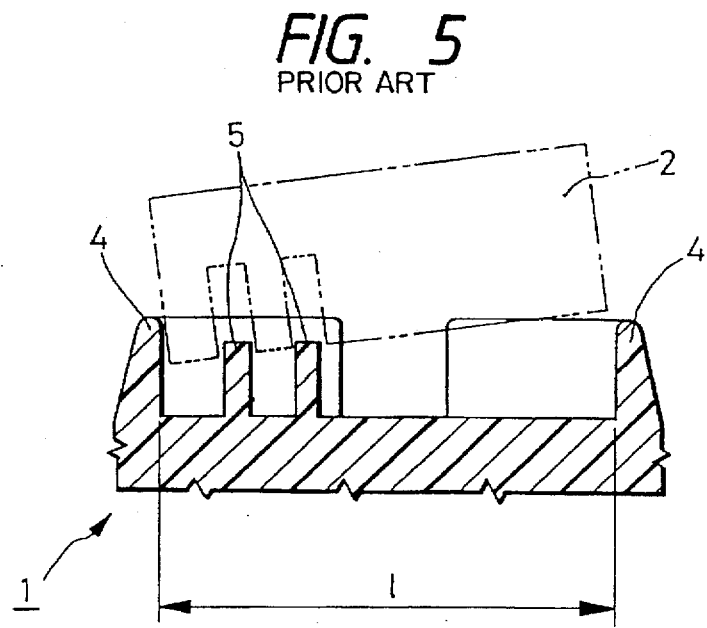
FIG. 5 is a diagram illustrative of how the electronic unit is obliquely inserted in FIG. 4.

FIG. 1 is a perspective view showing a guide structure for an electronic unit of the present invention before being attached; and FIG. 2 is a sectional view of the guide structure the electronic unit that is in the course of being attached. It should be noted that parts and components similar to those shown in FIGS. 4 and 5 are denoted by the same reference numerals, and any duplicate description will be given briefly.

An electrical connection box body 1 formed so as to be substantially box-like by molding an electrically insulating resin has a built-in circuit wiring on which electrical parts such as capacitors are mounted. A connector 5 that is electrically connected to the circuit wiring is disposed on a unit attaching surface 3 formed on an outer surface.

In a manner similar to the conventional structure, guide walls 4 are projectingly disposed at positions corresponding to the four corners of the electronic unit 2 on the unit attaching surface 3 so that the guide walls 4 substantially coincide with the contour of the electronic unit 2.

Engagement receiving portions 6 engageable with retaining pawls 7 of the electrical connection box body 1 are arranged on the electronic unit 2. Similar to these engagement receiving portions 6, a pair of guide grooves 12 formed in the electronic unit insertion direction are disposed on the outer surfaces of confronting peripheral walls of the electronic unit 2, respectively. It should be noted that each guide groove 12 is arranged on the same peripheral wall surface as the engagement receiving portion 6 of the electronic unit 2 in this embodiment.

On the other hand, guide ribs 11 engageable with the guide grooves 12 are projectingly disposed on the unit attaching surface 3. Each of these guide ribs 11 is arranged so as to correspond to a phantom line J which is drawn from one side between two adjacent guide walls 4 toward the confronting side and which is drawn at such a position as not to interfere with the connector 5. In addition, the guide ribs 11 are designed to divide the unit attaching surface 3 into two regions whose sizes are different from each other. That is, as shown by the sectional view in FIG. 2, each of the guide ribs 11 is arranged so as to interpose a distance n between the inner wall portion of one of the guide walls 4 and the guide rib itself. The distance n is set to a value smaller than a distance m between the guide walls 4. Accordingly, a small-sized electronic unit 2 can be attached to the region that is defined by the narrow distance n. The guide ribs 11 are thus engaged with the outer surfaces of the peripheral walls of this small-sized electronic unit 2 to position this electronic unit 2. Hence, the electrical connection box body 1 is general-purpose, allowing the electronic unit 2 whose size is different to be attached thereto as well.

It should be noted that while each guide rib 11 is arranged so as to be a part of the guide wall 4 in this embodiment, the guide rib 11 may not necessarily be of continuous structure, but may be independent of the guide wall 4.

Further, the electrical connection box body 1 has an abutment boss 9 and attaching holes 10 formed on lower brackets 13 as conventionally arranged.

The electronic unit 2 guide structure is formed by the electrical connection box body 1, the electronic unit 2, the guide walls 4, the guide ribs 11, the guide grooves 12, the engagement receiving portions 6, and the retaining pawls 7 as the major parts or portions.

How the electronic unit 2 is attached to the electrical connection box body 1 through the guide structure for the electronic unit will be described next. First, the electronic unit 2 is opposed to the unit attaching surface 3 of the electrical connection box body 1. Then, the electronic unit 2 is inserted into the unit attaching surface 3 so as to allow the guide ribs 11 to be engaged with the guide grooves 12. As a result, the electronic unit 2 is inserted with the outer wall surfaces of the electronic unit guided into the guide walls 4 together with the guide ribs 11. As the electronic unit 2 is further inserted, the connector of the electronic unit 2 is soon connected to the connector 5 of the body 1 to each other, thereby causing the electronic unit 2 to be abutted against the unit attaching surface 3. Immediately before such condition, the engagement receiving portions 6 slide up on the retaining pawls 7 of the lock portions 8 to be temporarily deformed outward and thereafter return to be finally engaged with the retaining pawls 7 as the insertion of the electronic unit 2 progresses. Accordingly, the electronic unit 2 has been attached to the electrical connection box body 1 in the locked state.

During the aforementioned operation, since each guide rib 11 is located at the distance n that is narrower than the distance m between the guide walls 4, the guide ribs 11 block oblique insertion of the electronic unit 2 at the time of attaching the electronic unit 2 to the electrical connection box body 1, thereby improving operability for the attachment.

Figure 3:
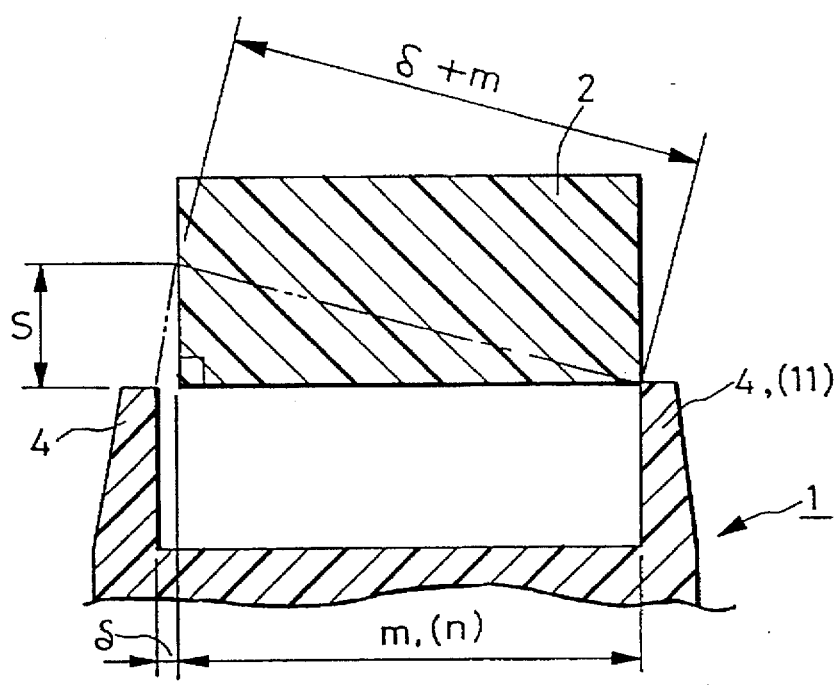
FIG. 3 is a diagram illustrative of the principal regarding the biased drop at the time the electronic unit is inserted obliquely.

Let us now illustrate the reason therefor with reference to FIG. 3. Assuming that the distance between the guide walls 4 is m; the insertion gap between the electronic unit 2 and the guide wall 4 is δ; and the biased drop at the time the electronic unit 2 is caused to confront the body 1 on the bias is S, then the following equation can be obtained from the formula of the triangle.

$$S^2+m^2=(\delta+m)^2$$

Since the insertion gap δ is extremely small compared with the distance m, δ<1, which allows $\delta^2$ to be negligible in the aforementioned equation. Therefore, by rearranging the above equation, $S=(2\delta m)^{1/2}$, allowing the biased drop S to be used as comparable data. Hence, the biased drop $S_2$ in the distance n between one guide wall 4 and the guide rib 11 becomes smaller than the biased drop $S_1$ in the distance m, which in turn reduce wrenches and thereby improves operability.

In addition, another reason why wrenches can be reduced resides in thickness tolerances of the guide rib 11 as well as width tolerances of the guide groove 12. That is, since it is easy to improve these tolerances, the biased drop can be significantly decreased, which thus contributes to preventing oblique insertion.

It should be noted that the present invention is not limited to the aforementioned embodiment, but may be appropriately modified to be embodied in various other modes. For example, while horizontal wrenches are prevented by the pair of guide ribs 11 and guide grooves 12 arranged on the upper and lower sides in the aforementioned embodiment, another pair of guide ribs 11 and guide grooves 12 engageable therewith may be additionally provided on the left and right sides to prevent oblique insertion in the vertical direction. Further, vertical wrenches may also be prevented by arranging a plurality of pairs of guide ribs and guide grooves on the left and right sides.

As described in the foregoing, according to the present invention, the guide structure for the electronic unit is characterized as providing not only guide grooves on the electronic unit side, but also guide ribs engageable with the guide grooves on the electrical connection box body in addition to the same guide walls as those in the conventional structure. Therefore, oblique insertion of the electronic unit 2 can be prevented when the electronic unit is attached to the electrical connection box body, thereby improving operability.

Furthermore, the guide ribs are arranged so as to surround an electronic unit of different size which is inserted between the guide walls and the guide ribs; i.e., the guide ribs are arranged so as to correspond to the outer surfaces of the peripheral walls of such electronic unit of different size. Therefore, the guide ribs can position such electronic unit of different size as predetermined, which means that the guide structure for the electronic unit is a general-purpose electronic unit guide structure that can accommodate diversification of electronic units.

What is claimed is:

1. A connector arrangement, comprising:
    an electrical connection member having a substantially planar surface and a plurality of guide walls projecting from said surface and extending around at least a portion of the periphery of said electrical connection member, said electrical connection member having an electrical connector disposed on said surface within a region defined by said guide walls, said electrical connector comprising a circumferential wall surrounding an electrical contact;

an electronic unit comprising another electrical connector for electrically mating with said electrical connector on said electrical connection member by relative movement in an insertion direction, said electronic unit including a side wall extending around the periphery thereof, said side wall having a plurality of guide grooves provided therein extending in said insertion direction, wherein said electrical connection member includes a plurality of guide ribs extending from said surface which are respectively received by said guide grooves, said guide ribs being located between said guide walls such that a first distance from one of said guide walls to said guide ribs is less than a second distance from said one guide wall to an opposing guide wall, said guide ribs being spaced apart from the circumferential wall of said electrical connector on said surface of said electrical connection member.

2. The connector arrangement of claim 1, wherein the electrical connection member has a substantially box-like shape and is made of an electrically insulating resin.

3. The connector arrangement of claim 1, wherein the guide walls are projectingly disposed at positions corresponding to four corners of the electronic unit so that the guide walls substantially coincide with a contour of the electronic unit.

4. The connector arrangement of claim 1, wherein the electrical connection box body includes retaining pawls, and the electronic unit includes engagement receiving portions arranged thereon and engageable with the retaining pawls of the electrical connection box body.

5. The connector arrangement of claim 4, wherein each of the guide grooves is arranged on the side wall that is adjacent the respective engagement receiving portions of the electronic unit.

6. The connector arrangement of claim 1, wherein said electronic unit has a parallelepiped shape.

7. The connector arrangement of claim 6, wherein said plurality of guide walls includes four pairs of guide walls, each pair combining to form an L-shaped guide structure located at a position corresponding to a corner of said electronic unit.

8. The connector arrangement of claim 1, wherein said guide ribs respectively extend from two of said plurality of guide walls.

9. The connector arrangement of claim 1, wherein the width of said electronic unit is slightly less than said first distance such that said electronic unit is received between said guide ribs and said one guide wall.

10. The connector arrangement of claim 1, wherein said guide ribs are discontinuous with respect to each other.

* * * * *